(12) United States Patent
Vanderheyden et al.

(10) Patent No.: US 7,239,474 B1
(45) Date of Patent: Jul. 3, 2007

(54) LEADER CONNECTING MECHANISM

(75) Inventors: William Vanderheyden, Loveland, CO (US); Phillip M. Morgan, Berthoud, CO (US)

(73) Assignee: Storage Technology Corporation, Louisville, CO (US)

( * ) Notice: Subject to any disclaimer, the term of this patent is extended or adjusted under 35 U.S.C. 154(b) by 483 days.

(21) Appl. No.: 10/844,844

(22) Filed: May 13, 2004

(51) Int. Cl.
*G11B 5/27* (2006.01)
*B65H 1/00* (2006.01)

(52) U.S. Cl. .................... 360/85; 242/332.4
(58) Field of Classification Search .......... 360/85; 242/332.4
See application file for complete search history.

(56) References Cited

U.S. PATENT DOCUMENTS

| | | | |
|---|---|---|---|
| 4,546,396 A | 10/1985 | Schatteman | |
| 4,662,049 A | 5/1987 | Hertrich | |
| 4,720,913 A | 1/1988 | Hertrich | |
| 5,769,346 A | 6/1998 | Daly | |
| 6,135,379 A | 10/2000 | Argumedo | |
| 6,278,572 B1 | 8/2001 | Kletzl et al. | |
| 6,311,915 B1 | 11/2001 | Rathweg | |
| 6,433,953 B1 * | 8/2002 | Taki et al. ................ 360/85 |
| 6,471,150 B1 | 10/2002 | Tsuchiya et al. | |
| 6,568,618 B1 | 5/2003 | Vanderheyden | |
| 6,592,063 B2 | 7/2003 | Tatsumi et al. | |
| 6,883,739 B2 | 4/2005 | Ojima | |
| 6,991,193 B2 * | 1/2006 | Kurokawa et al. ....... 242/332.4 |
| 2005/0092858 A1 * | 5/2005 | Kurokawa et al. ....... 242/332.1 |

FOREIGN PATENT DOCUMENTS

| | | |
|---|---|---|
| EP | 0143598 A | 6/1985 |
| WO | 83/04453 A | 12/1983 |
| WO | 98/44499 A | 10/1998 |

* cited by examiner

*Primary Examiner*—Allen Cao
(74) *Attorney, Agent, or Firm*—Brooks Kushman P.C.

(57) ABSTRACT

A leader connecting mechanism is for connecting a first leader to a second leader includes a guide member having a track. The mechanism further includes an engaging member that is engageable with the first leader. The engaging member is slidable along the track of the guide member for connecting the first leader to the second leader.

22 Claims, 6 Drawing Sheets

LEADER CONNECTING MECHANISM

BACKGROUND OF THE INVENTION

1. Field of the Invention

The invention relates to a leader connecting mechanism for a tape drive.

2. Background Art

A tape drive may include a mechanism for connecting a drive leader to a cartridge leader of a tape cartridge. Examples of such mechanisms are disclosed in U.S. Pat. Nos. 4,662,049; 4,720,913; 5,769,346 and 6,311,915.

SUMMARY OF THE INVENTION

Under the invention, a leader connecting mechanism is provided for connecting a first leader of a tape drive to a second leader of a tape cartridge. The mechanism includes a guide member having a track, and an engaging member that is engageable with the first leader. The engaging member is slidable along the track of the guide member for connecting the first leader to the second leader.

Further under the invention, a tape drive for use with a tape cartridge having a cartridge leader is provided. The tape drive includes a drive body and a drive leader that is engageable with the cartridge leader and moveable with respect to the drive body. A guide member is supported by the drive body and has a track. The tape drive further includes an engaging member that is engageable with the drive leader and slidable along the track of the guide member for connecting the drive leader with the cartridge leader of the tape cartridge.

Still further under the invention, a leader connecting mechanism is provided for connecting a first leader of a tape drive to a second leader of a tape cartridge. The mechanism includes a guide member and a coupling member that is engageable with the first leader and moveable along the guide member for connecting the first leader to the second leader. The coupling member is moveable laterally and longitudinally with respect to the guide member. The mechanism also includes a drive member that is engageable with the coupling member for moving the coupling member along the guide member. Furthermore, the drive member is moveable generally linearly along the guide member.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION OF THE PREFERRED EMBODIMENT(S)

Figure 1:
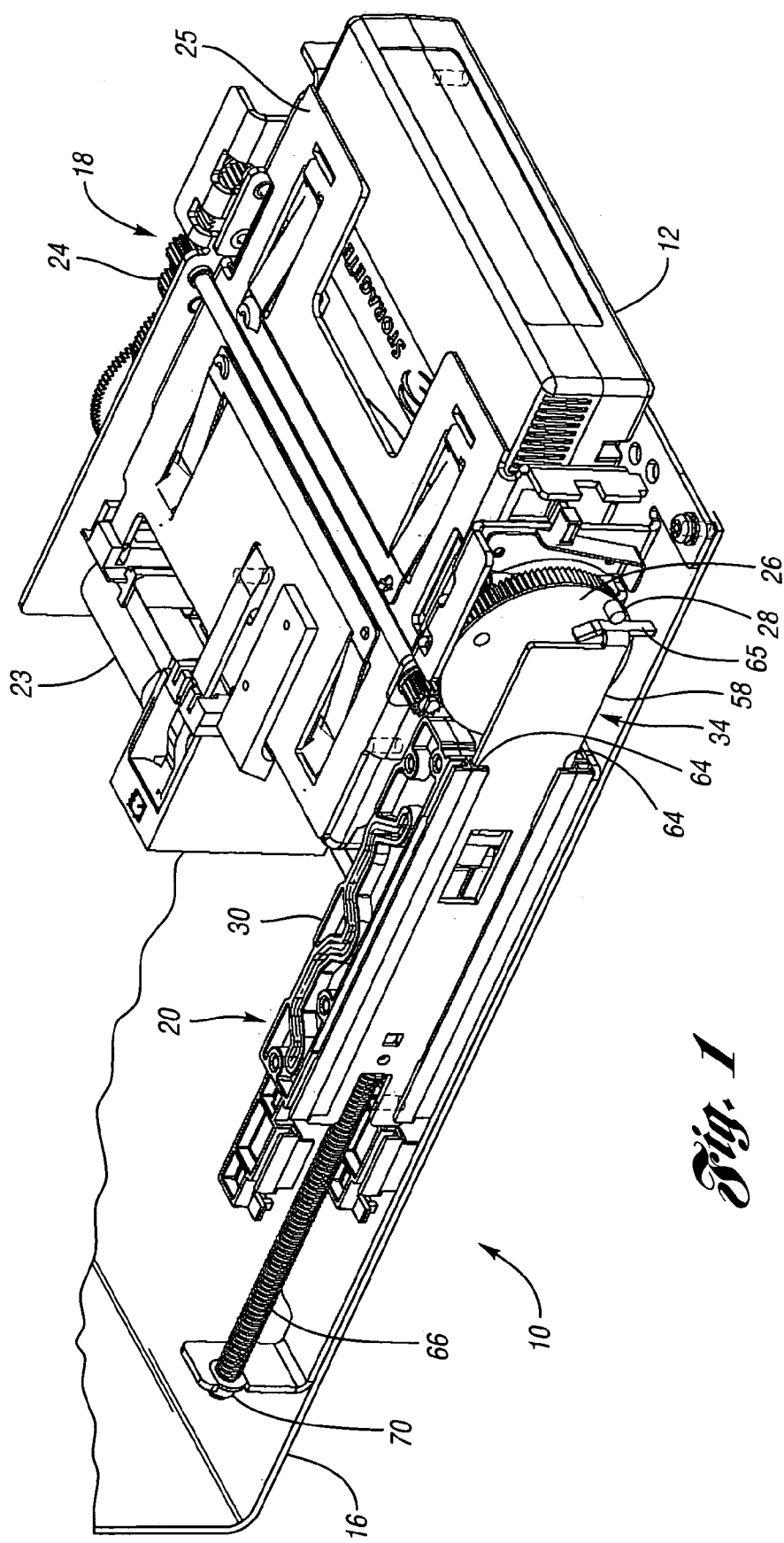
FIG. 1 is a perspective view of a tape cartridge and a tape drive according to the invention.
Figure 2:
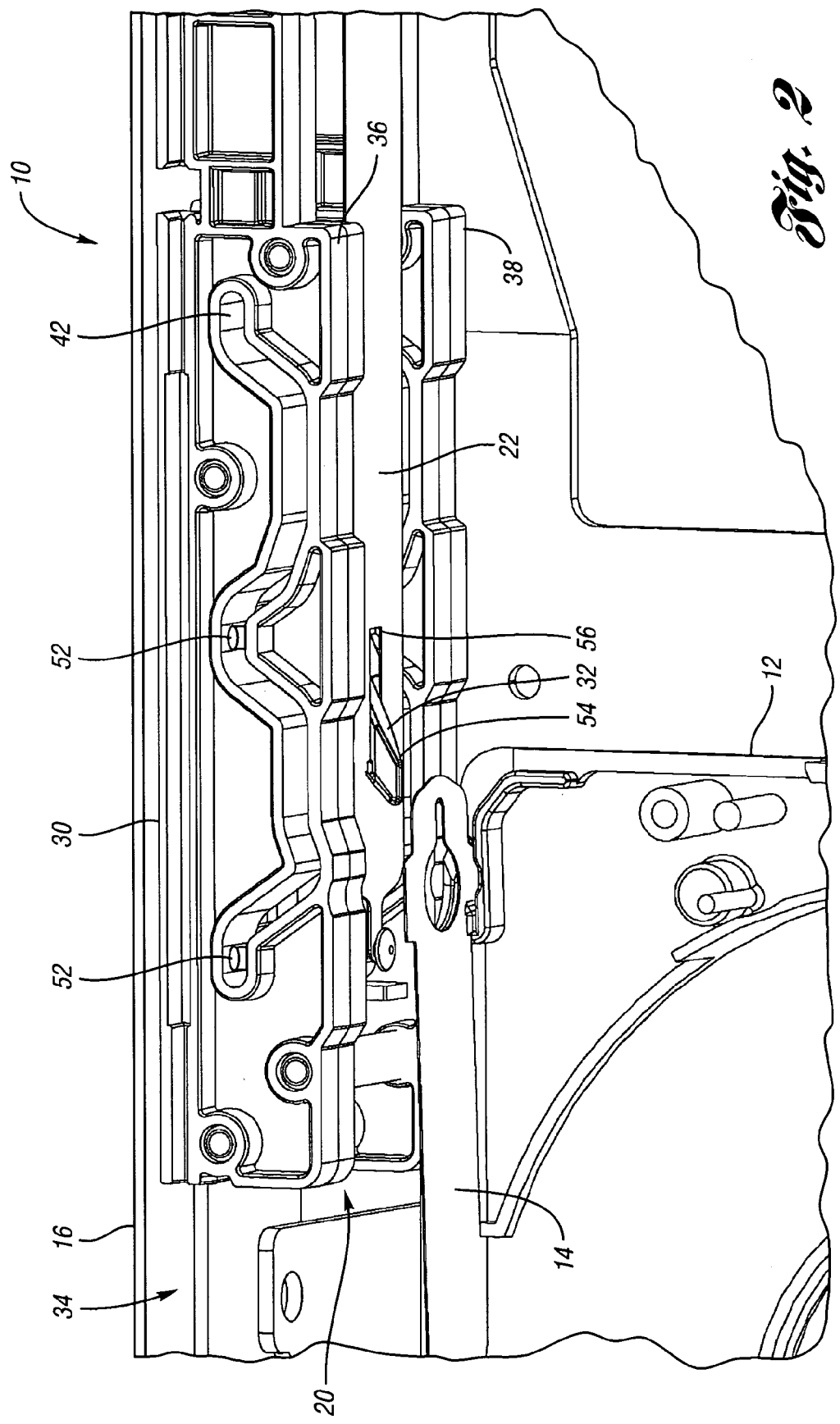
FIG. 2 is a perspective view of a leader connecting mechanism of the tape drive, showing an engaging member of the leader connecting mechanism in an initial position, and a tape leader of the tape drive disengaged from a cartridge leader of the tape cartridge.

FIGS. 1 and 2 show a tape drive 10 according to the invention. The tape drive 10 is configured to receive a tape cartridge 12 having a cartridge leader 14 attached to a length of magnetic tape (not shown). The tape drive 10 is further configured to perform read and/or write operations on the magnetic tape of the tape cartridge 12.

The tape drive 10 includes a drive body, such as a housing 16, for receiving the tape cartridge 12, and an elevator assembly 18 supported by the housing 16 for moving the tape cartridge 12 with respect to the housing 16. The tape drive 10 further includes a leader connecting mechanism 20, such as a buckling mechanism, for connecting a drive leader 22 of the tape drive 10 to the cartridge leader 14, so that the drive leader 22 may route the cartridge leader 14 through the tape drive 10, as explained below in detail.

While the elevator assembly 18 may have any suitable configuration, in the embodiment shown in FIG. 1, the elevator assembly 18 includes a motor 23, a gear train 24 connected to the motor 23, and a shuttle 25 associated with the gear train 24 and configured to receive the tape cartridge 12. Furthermore, the elevator assembly 18 is configured to move the tape cartridge 12 with respect to the housing 16. For example, the elevator assembly 18 may be used to raise and/or lower the tape cartridge 12 with respect to the housing 16. More specifically, the gear train 24 may include a gear or cam 26 having a cam slot (not shown) that engages a projection (not shown) on the shuttle 25. Rotation of the cam 26 in a first direction, such as clockwise, may lower the shuttle 25 with respect to the housing 16, and rotation of the cam 26 in an opposite second direction may raise the shuttle 25.

The elevator assembly 18 may also be used to actuate the leader connecting mechanism 20. For example, the cam 26 of the gear train 24 may have an engaging portion, such as a post 28, that is engageable with the leader connecting mechanism 20 for moving a portion of the leader connecting mechanism 20, as explained below in detail.

Figure 3:
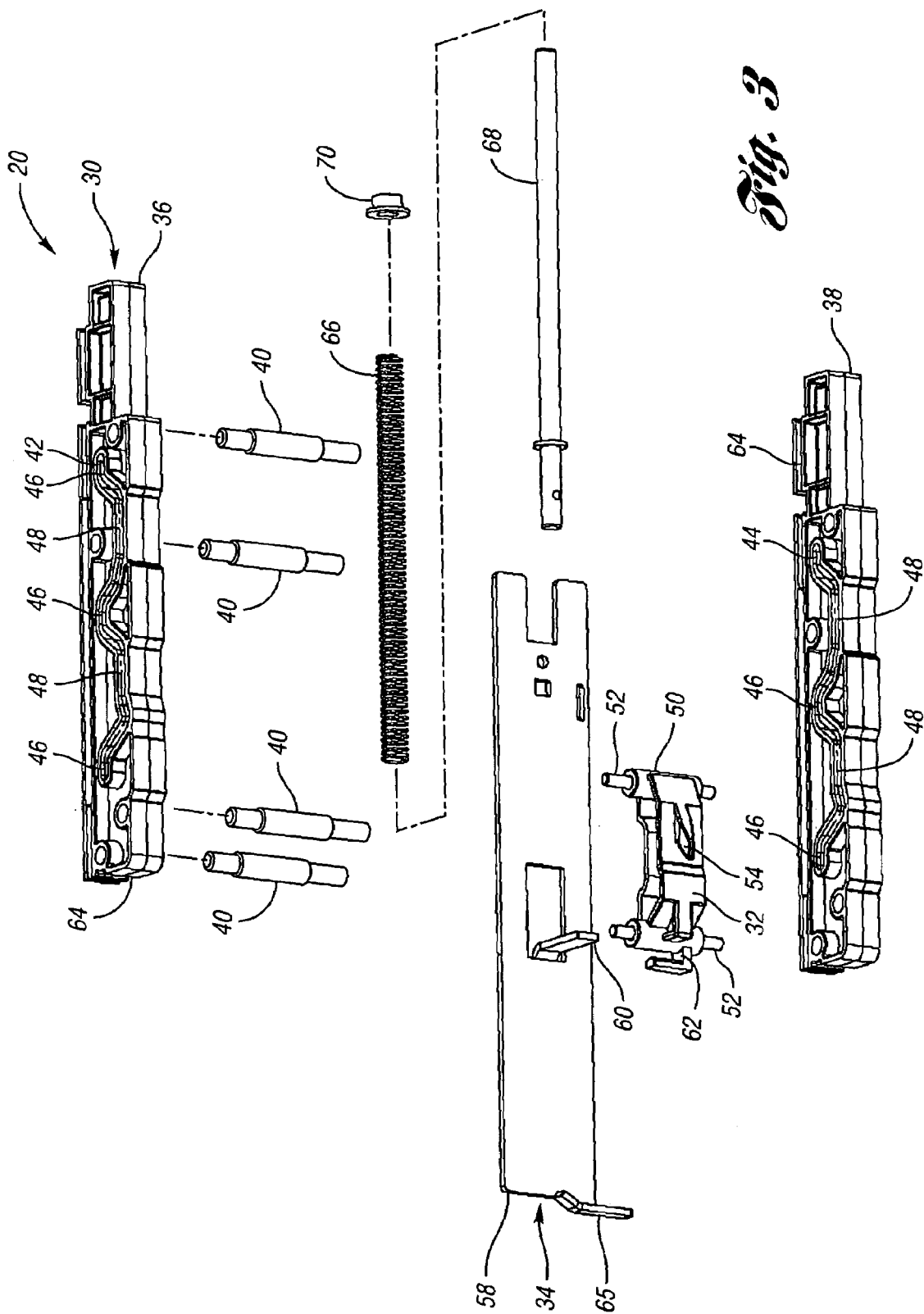
FIG. 3 is an exploded perspective view of the leader connecting mechanism.
Figure 4:
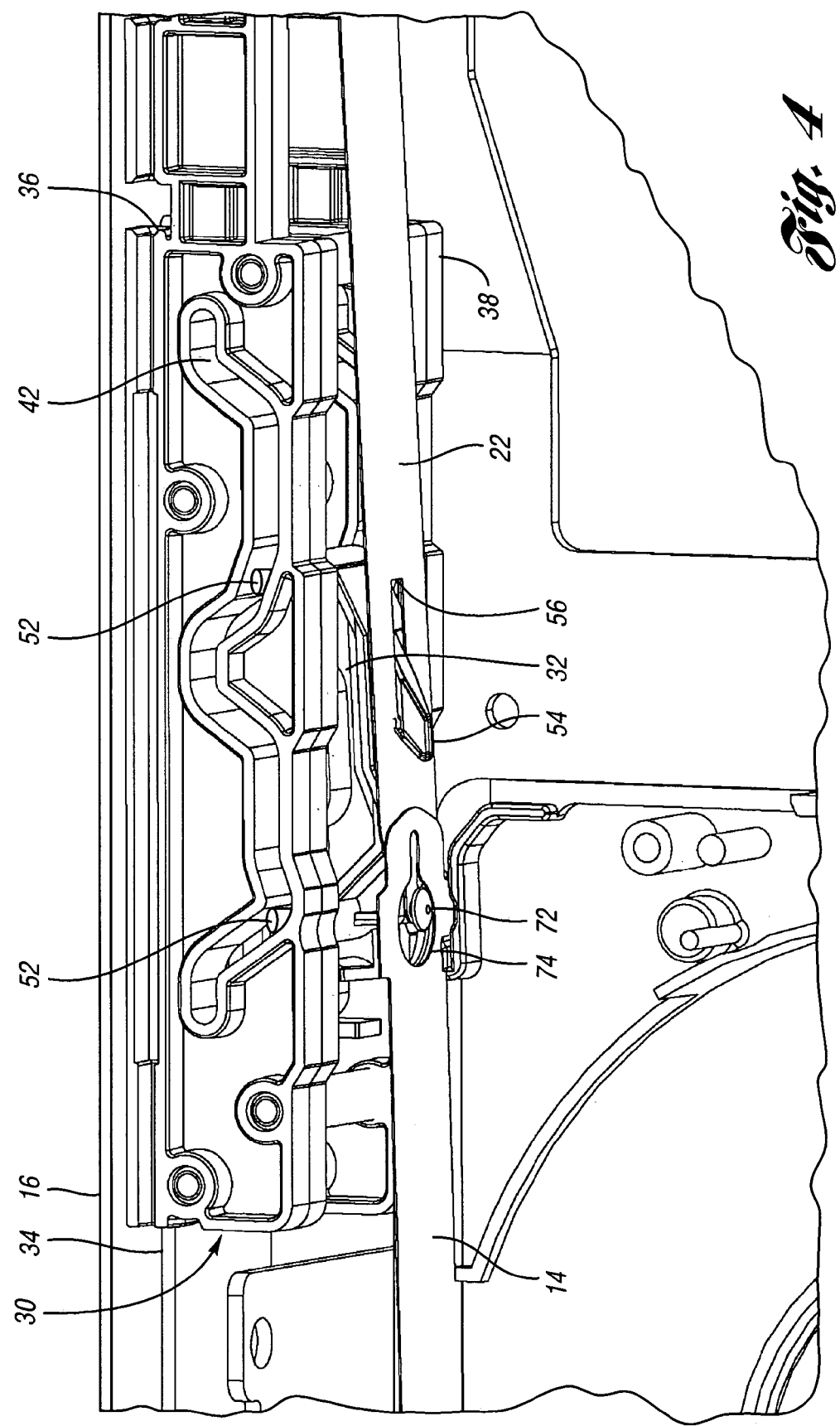
FIG. 4 is a perspective view of the leader connecting mechanism with the engaging member moved to an intermediate position.

Referring to FIGS. 1–3, the leader connecting mechanism 20 includes a guide member 30 supported by the housing 16, a coupling member or engaging member 32 that is engageable with the drive leader 22 and moveable with respect to the guide member 30, and a drive arrangement 34 that is engageable with the engaging member 32. In one embodiment of the invention, the guide member 30 is fixed to the housing 16 in any suitable manner, such as with adhesive and/or fasteners, and includes first and second sections 36 and 38, respectively, that are connected together with fasteners, such as posts 40. The first and second sections 36 and 38, respectively, have first and second guide tracks 42 and 44, respectively, for guiding movement of the engaging member 32. The tracks 42 and 44 are substantially similar and may be configured to vary the angular orientation of the engaging member 32 as the engaging member 32 translates along the tracks 42 and 44. While the tracks 42 and 44 may have any suitable configuration, in the embodiment shown in FIG. 3, each track 42 and 44 has a non-linear configuration having multiple peaks 46 and valleys 48.

The engaging member 32 may have any suitable configuration such that the engaging member 32 is slidable along the tracks 42 and 44. For example, the engaging member 32 may include a main body 50 and one or more projections 52 that extend from the main body 50 and that are engageable with the tracks 42 and 44. The engaging member 32 further includes an engaging portion 54, such as a hook or other projection, that is engageable with an aperture 56 formed in the drive leader 22.

Alternatively, the engaging portion 54 may have any suitable configuration for engaging the drive leader 22. For example, the engaging portion 54 may be an aperture that is configured to receive a projection on the drive leader 22.

The drive arrangement 34 includes a drive member 58 that is engageable with the engaging member 32 for moving the engaging member 32 along the guide member 30. In the embodiment shown in FIG. 3, the drive member 58 includes an engaging portion, such as tab 60, that is configured to be received in a slot 62 of the engaging member 32.

The drive member 58 may also be configured to slide along the guide member 30. For example, the drive member 58 may slide along additional guide tracks 64 formed in the guide member 30. While the tracks 64 may have any suitable configuration, in the embodiment shown in the Figures, the tracks 64 are generally linear.

The drive member 58 may be driven in any suitable manner and by any suitable mechanism. In the embodiment shown in the FIG. 1, for example, the drive member 58 is driven by the elevator assembly 18. More specifically, upon rotation of the cam 26, the post 28 of the cam 26 engages a tab 65 on the drive member 58 and urges the drive member 58 along the guide member 30.

As another example, the drive member 58 may be driven by a motor and gear train or other drive assembly (not shown) that are separate from the elevator assembly 18.

In addition, the drive arrangement 34 may include a biasing member, such as a spring 66, for urging the drive member 58 toward a home position shown in FIGS. 1 and 2. Referring to FIGS. 1 and 3, the spring 66 may be positioned on a rod 68 that is attached to the drive member 58 and moveable through a bushing 70, which is attached to the drive body 16.

Referring to FIGS. 1–6, operation of the tape drive 10 will now be described. First, the tape cartridge 12 may be inserted into the tape drive 10 either manually or automatically. Next, the elevator assembly 18 may be used to lower the tape cartridge 12 onto a motor (not shown) of the tape drive 10. Once the tape cartridge 12 is in the lowered position, the elevator assembly 18 may continue to operate, thereby causing the cam 26 to rotate in the first direction into engagement with the drive member 58. Continued rotation of the cam 26 in the first direction causes the drive member 58 to move away from the home position, shown in FIGS. 1 and 2. As a result, the drive member 58 causes the engaging member 32 to move from an initial position, shown in FIG. 2, toward a final position, shown in FIG. 6.

As the engaging member 32 translates toward the final position, the tracks 42 and 44 cause the engaging member 32 to move toward the cartridge leader 14. Upon reaching an intermediate position shown in FIG. 4, the engaging member 32 is configured to position the drive leader 22 for coupling engagement with the cartridge leader 14. For example, the engaging member 32 may be configured to move laterally with respect to the guide member 30, as the engaging member 32 moves toward the intermediate position, to thereby cause a button 72 of the drive leader 22 to extend into an opening 74 of the cartridge leader 14.

Figure 5:
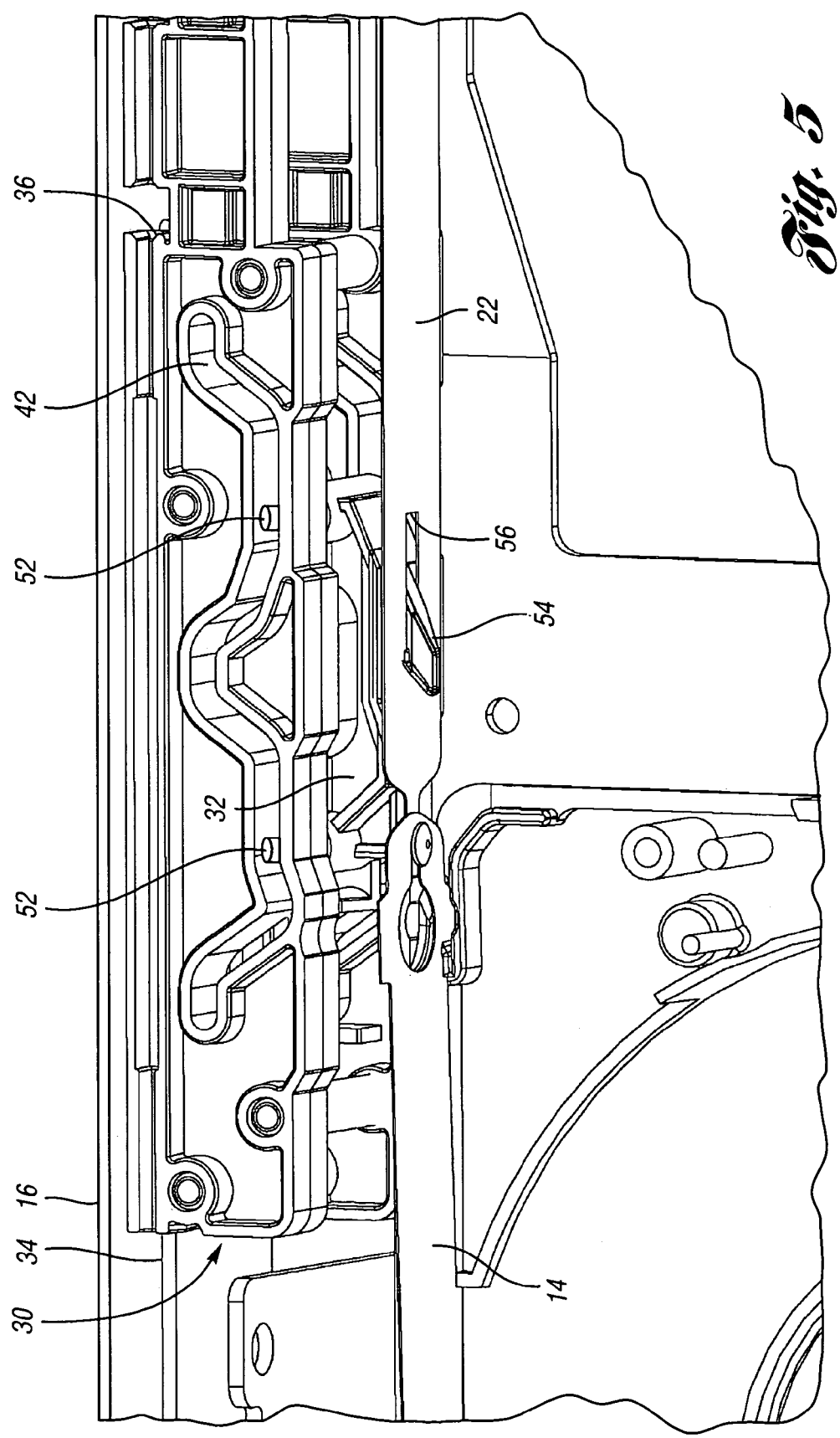
FIG. 5 is a perspective view of the leader connecting mechanism showing the drive leader fully coupled to the tape leader.
Figure 6:
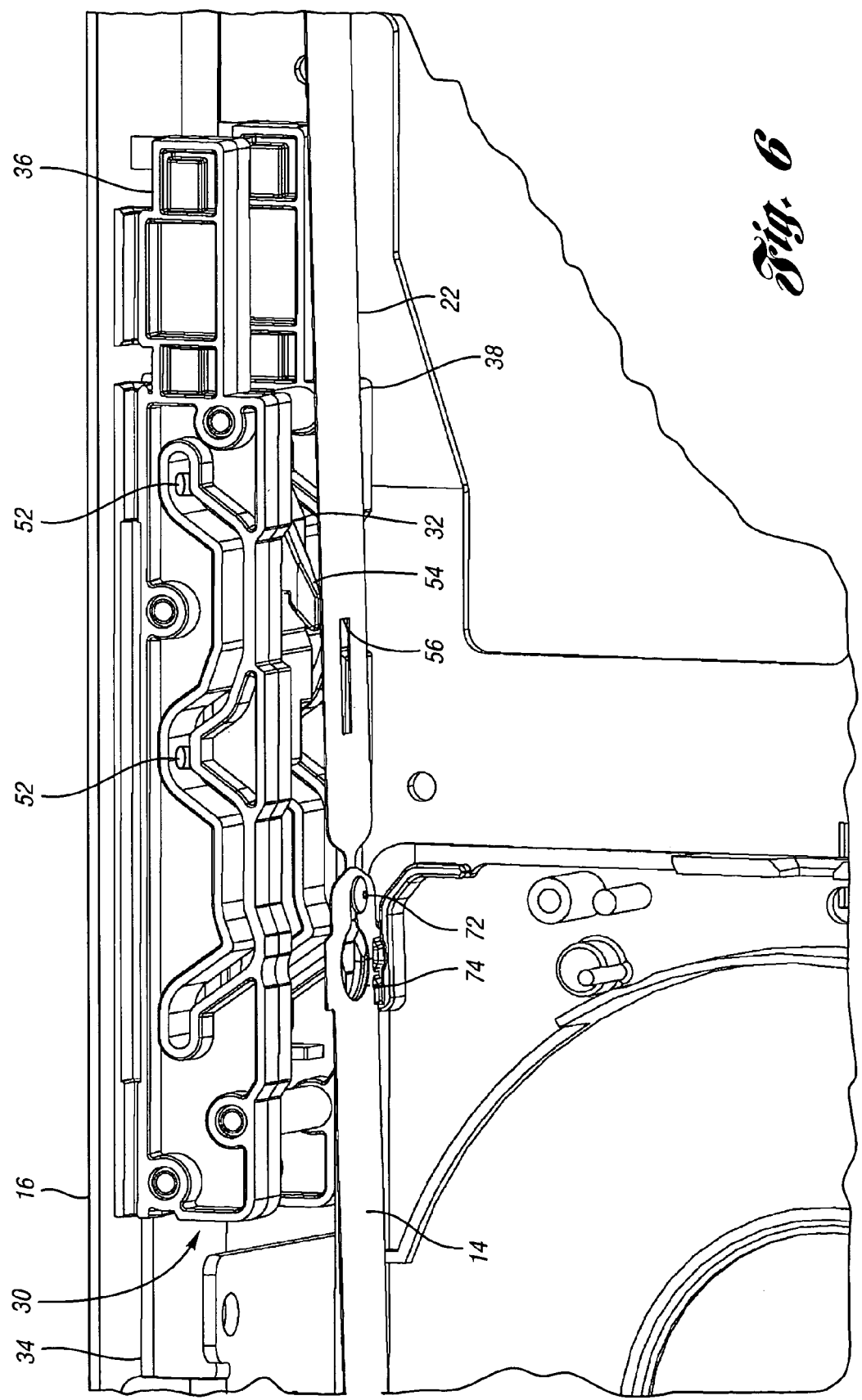
FIG. 6 is a perspective view of the leader connecting mechanism with the engaging member moved to a final position.

Continued movement of the engaging member 32 and drive leader 22 may allow the button 72 to fully engage the opening 74, thereby coupling the drive leader 22 to the cartridge leader 14, as shown in FIG. 5. Further movement of the engaging member 32 toward the final position causes the engaging member 32 to move laterally away from the cartridge leader 14, as shown in FIG. 6. Because the drive leader 22 is now coupled to the cartridge leader 14, this movement of the engaging member 32 also causes the engaging portion 54 to disengage the aperture 56, thereby releasing the drive leader 22 from the engaging member 32.

Alternatively, the leaders 14 and 22 may have any suitable configuration that enables the leaders 14 and 22 to be coupled together. For example, the drive leader 22 may include an opening for receiving a button or other projection of the cartridge leader 14.

Once coupled to the cartridge leader 14, the drive leader 22 may then be used to route the cartridge leader 14 and magnetic tape (not shown) of the tape cartridge 12 through a tape path (not shown) to a take-up reel (not shown) of the tape drive 10. More specifically, the take-up reel, which is connected to the drive leader 22, may be rotated to draw the drive leader 22 and cartridge leader 14 through the tape path. Next, the tape drive 10 may be used to perform read and/or write operations on the magnetic tape.

Upon rotation of the cam 26 in the second direction opposite the first direction, the engaging member 32 may return to the initial position shown in FIGS. 1 and 2. As mentioned above, the spring 66 may be used to urge the drive member 58 toward the home position, thereby urging the engaging member 32 toward the initial position.

The initial and final positions of the engaging member 32 may be established in any suitable manner. For example, the initial position may be established by engagement of the rod 68 with one of the posts 40. As another example, the initial position and/or final position may be established by engagement of one of the projections 52 with an end of one of the tracks 42 or 44. As yet another example, one or more sensors may be used to stop movement of the cam 26 when the engaging member 32 has reached a desired position.

With the above configuration, longitudinal, lateral and angular movement of the engaging member 32 may be effectively controlled by the guide member 30. As a result, improved leader connection reliability may be achieved.

Furthermore, the leaders 14 and 22 may have any suitable configuration and may be made of any suitable material. For example, the leaders 14 and 22 may each have a thin, elongated configuration and may be made of a flexible material, such as polyethylene.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A leader connecting mechanism for connecting a first leader of a tape drive to a second leader of a tape cartridge, the mechanism comprising:
    a guide member having a track; and
    an engaging member that is engageable with the first leader, the engaging member being slidable along the track of the guide member for connecting the first leader to the second leader, wherein the engaging member includes two guide projections that are slidable along the track.

2. The mechanism of claim 1 wherein the engaging member includes a projection that is engageable with an aperture formed in the first leader.

3. The mechanism of claim 1 wherein the guide member includes an additional track, and the guide projections are slidable along the additional track.

4. The mechanism of claim 3 wherein each track has a non-linear track configuration, and the track configurations are generally similar.

5. The mechanism of claim 1 wherein the track is configured to vary the angular orientation of the engaging member when the engaging member slides along the track.

6. The mechanism of claim 1 further comprising a drive member that is engageable with the engaging member for sliding the engaging member along the track.

7. The mechanism of claim 6 wherein the guide member includes an additional track for guiding movement of the drive member.

8. The mechanism of claim 6 further comprising a biasing member for urging the drive member toward a home position.

9. A tape drive for use with a tape cartridge having a cartridge leader, the tape drive comprising:
   a drive body;
   a drive leader that is engageable with the cartridge leader and moveable with respect to the drive body;
   a guide member supported by the drive body and having first and second tracks;
   an engaging member that is engageable with the drive leader and slidable along the first track of the guide member for connecting the drive leader with the cartridge leader of the tape cartridge; and
   a drive member that is engageable with the engaging member for sliding the engaging member along the first track, wherein the second track of the guide member guides movement of the drive member.

10. The drive of claim 9 wherein the engaging member includes a projection that is engageable with an aperture formed in the drive leader.

11. The drive of claim 9 wherein the engaging member includes two guide projections that are slidable along the first track.

12. The drive of claim 11 wherein the guide member includes a third track, and the guide projections are slidable along the third track.

13. The drive of claim 12 wherein each of the first and third tracks has a non-linear track configuration, and the track configurations are generally similar.

14. The drive of claim 9 wherein the first track is configured to vary the angular orientation of the engaging member when the engaging member slides along the first track.

15. The drive of claim 9 wherein the first track has a non-linear configuration, and the second track has a generally linear configuration.

16. A leader connecting mechanism for connecting a first leader of a tape drive to a second leader of a tape cartridge, the mechanism comprising:
   a guide member;
   a coupling member that is engageable with the first leader and moveable along the guide member for connecting the first leader to the second leader, the coupling member being moveable laterally and longitudinally with respect to the guide member; and
   a drive member that is engageable with the coupling member for moving the coupling member along the guide member, the drive member being moveable generally linearly along the guide member.

17. The mechanism of claim 16 wherein the guide member includes a track for guiding movement of the drive member.

18. A tape drive for use with a tape cartridge having a cartridge leader, the tape drive comprising:
   a drive body;
   a drive leader that is engageable with the cartridge leader and moveable with respect to the drive body;
   a guide member supported by the drive body and having a track; and
   an engaging member that is engageable with the drive leader and slidable along the track of the guide member from an initial position to a final position for connecting the drive leader with the cartridge leader of the tape cartridge, wherein the engaging member is configured to be disengaged from the drive leader when the engaging member is in the final position and the drive leader has been connected to the cartridge leader.

19. The drive of claim 18 further comprising a take-up reel connected to the drive leader, wherein the take-up reel is rotatable to draw the drive leader through a tape path of the tape drive.

20. The drive of claim 18 wherein the drive leader comprises a flexible material.

21. The drive of claim 18 further comprising a drive member that is engageable with the engaging member for moving the engaging member along the track of the guide member, wherein the engaging member is moveable laterally and longitudinally with respect to the guide member, and the drive member is moveable generally linearly along the guide member.

22. The drive of claim 21 wherein the guide member includes an additional track for guiding movement of the drive member.

* * * * *